US012674811B2

(12) United States Patent
Lin et al.

(10) Patent No.: US 12,674,811 B2
(45) Date of Patent: Jul. 7, 2026

(54) SAMPLE RACK RECOVERY METHOD AND MANIPULATION DEVICE, DETECTION SYSTEM, AND COMPUTER-READABLE MEDIUM

(71) Applicant: BECKMAN COULTER, INC., Wilmington, DE (US)

(72) Inventors: Chuan Lin, Suzhou (CN); Liang Zhao, Suzhou (CN)

(73) Assignee: BECKMAN COULTER, INC., Wilmington, DE (US)

( * ) Notice: Subject to any disclaimer, the term of this patent is extended or adjusted under 35 U.S.C. 154(b) by 556 days.

(21) Appl. No.: 18/274,843

(22) PCT Filed: Jan. 28, 2021

(86) PCT No.: PCT/CN2021/074070

§ 371 (c)(1),
(2) Date: Jul. 28, 2023

(87) PCT Pub. No.: WO2022/160152

PCT Pub. Date: Aug. 4, 2022

(65) Prior Publication Data

US 2024/0103030 A1 Mar. 28, 2024

(51) Int. Cl.
*G01N 35/04* (2006.01)

(52) U.S. Cl.
CPC ..... *G01N 35/04* (2013.01); *G01N 2035/0415* (2013.01); *G01N 2035/0465* (2013.01)

(58) Field of Classification Search
CPC ... G01N 2035/0415; G01N 2035/0465; G01N 35/04
See application file for complete search history.

(56) References Cited

U.S. PATENT DOCUMENTS

2011/0076193 A1 3/2011 Kitagawa
2011/0162438 A1 7/2011 Tokieda et al.
(Continued)

FOREIGN PATENT DOCUMENTS

CN 107884589 A 4/2018
CN 109212242 A 1/2019
(Continued)

OTHER PUBLICATIONS

European Supplementary Search Report EP 21921772.6 dated Sep. 26, 2024, 12 pages.
(Continued)

*Primary Examiner* — Jennifer Wecker
*Assistant Examiner* — Jonathan Bortoli
(74) *Attorney, Agent, or Firm* — FBT Gibbons LLP

(57) ABSTRACT

A sample rack recovery method after an accidental interruption of operation of a sample rack manipulation device (10), a sample rack manipulation device (10) capable of performing the method, an automatic detection system (1) comprising the device (10), and a computer-readable medium in which a program for executing the method is stored. The device (10) comprises a conveying device (103) adapted to move in a transport area (TB) to convey a sample rack (30) between a loading/unloading area (TA), sampling areas (TD, TE) and a buffer area (TC). The method comprises: a conveying device detection step of detecting the state of a conveying device (103); a sample rack detection step of detecting the position of a sample rack (30) in a sample rack manipulation device (10); and a sample rack recovery step of conveying the sample rack (30) to a loading/unloading area (TA) by the conveying device (103) according to the detection results of the conveying device (103) and the sample rack (30).

19 Claims, 8 Drawing Sheets

(56)　　　　　References Cited

U.S. PATENT DOCUMENTS

| 2016/0084864 A1* | 3/2016 | Tokieda | ................. | G01N 35/04 |
| | | | | 414/222.13 |
| 2017/0121120 A1 | 5/2017 | Hanaya et al. | | |

FOREIGN PATENT DOCUMENTS

| CN | 110658348 | A | 1/2020 |
| CN | 110683327 | A | 1/2020 |
| CN | 110967499 | A | 4/2020 |
| CN | 110967504 | A | 4/2020 |
| CN | 112415216 | A | 2/2021 |
| EP | 2 755 037 | A1 | 7/2014 |
| EP | 3 064 947 | A1 | 9/2016 |
| JP | 2003057251 | A | 2/2003 |
| JP | 2006038881 | A | 2/2006 |
| WO | WO 2022/160152 | A1 | 4/2022 |

OTHER PUBLICATIONS

International Search Report and Written Opinion for PCT/CN2021/074070 mailed Nov. 4, 2021, 6 pages.

* cited by examiner

SAMPLE RACK RECOVERY METHOD AND MANIPULATION DEVICE, DETECTION SYSTEM, AND COMPUTER-READABLE MEDIUM

PRIORITY

This application is a § 371 national stage entry of International Pat. App. No. PCT/CN2021/074070, entitled "Sample Rack Recovery Method and Manipulation Device, Detection System, and Computer-Readable Medium," filed on Jan. 28, 2021, and published as WO 2022/160152 on Aug. 4, 2022, the disclosure of which is incorporated by reference herein.

FIELD

The present application relates to the field of medical technology, and in particular to a sample rack recovery method after an accidental interruption of operation of a sample rack manipulation device, a sample rack manipulation device capable of performing the sample rack recovery method, an automatic testing system including the sample rack manipulation device, and a computer-readable medium in which programs for executing the sample rack recovery method are stored.

BACKGROUND

The contents of this section only provide background information related to the present application, which may not necessarily be the prior art.

An Automatic testing system (also known as analytical test instrument) is typically used to analyze the contents in a sample tube for various purposes. The analytical test instrument typically includes a sample rack manipulation portion, a sampling portion, and a testing portion. The sample rack manipulation portion is configured to convey the sample tube to the sampling portion, and the sampling portion is configured to transfer the sample in the sample tube to the testing portion for testing of the sample.

A sample rack is configured to receive, support, align, hold and/or carry one or more sample tubes to ensure that the sample tubes are positioned and/or transferred within the analytical test instrument. A sample rack manipulation device (the sample rack manipulation portion) is configured to load, convey and/or unload one or more sample racks and thus includes a loading/unloading area, a transfer area, a sampling area and the like. The sample rack manipulation device includes a cover body, an upper cover connected to the cover body by bolts and the like to cover various areas, and a door.

After the operation of the sample rack manipulation device is interrupted by accidental power failure, an operator usually needs to open the door and the upper cover of the sample rack manipulation device to allow the operator to reach the areas, manually take out the sample racks staying at the areas of the sample rack manipulation device one by one, then close the door of the sample rack manipulation device, and then restart and restore the sample rack manipulation device.

Manual removal of the sample rack is inconvenient and therefore is inefficient. Moreover, due to a sampling channel of the sample rack usually being narrow, it is easy to spill the sample when the sample rack is taken out manually, which may pollute other samples and even bring potential safety hazards to the operator.

For this reason, it is desirable in the art to provide a sample rack manipulation device that can automatically recover a sample rack after an accidental interruption of operation.

SUMMARY

This section provides a general summary of the present application, and is not a comprehensive disclosure of its full scope or all of its features.

According to an aspect of the present application, a sample rack recovery method after an accidental interruption of operation of a sample rack manipulation device is provided. The sample rack manipulation device includes a shuttle configured to move in a transfer area to convey a sample rack between a loading/unloading area, a sampling area and a buffer area. The method includes: a shuttle detection step of detecting a state of the shuttle; a sample rack detection step of detecting a position of the sample rack in the sample rack manipulation device; and a sample rack recovery step of conveying the sample rack to the loading/unloading area by the shuttle, based on the state of the shuttle and the position of the sample rack.

With the method according to the present application, the sample rack can be automatically recovered to the loading/unloading area after the sample rack manipulation device is restarted. With the sample rack recovery method, some problems that are caused during manual recovery are solved. For example, since the sample rack in the sampling area and the buffer area is automatically recovered to the loading/unloading area through the shuttle, the operator can easily take out the sample rack from the loading/unloading area proximate to the door without opening the upper cover of the sample rack manipulation device and manually taking out the sample rack by reaching into the sampling area and the buffer area away from the door, thereby improving the recovery efficiency of the sample rack. In addition, the sample rack can be automatically recovered through the shuttle, which can prevent the pollution and potential safety hazards caused by sample splashing due to improper operation of the operator.

In some embodiments, in the shuttle detection step, a position of the shuttle and a loading state of the sample rack are detected.

In some embodiments, the sample rack recovery method further includes: determining, based on the position of the shuttle and the loading state of the sample rack, whether the shuttle is in a non-interactive state in which the shuttle is movable freely or in an interactive state with the loading/unloading area, the sampling area or the buffer area.

In some embodiments, the sample rack recovery method further includes: when it is determined that the shuttle is in the non-interactive state, determining whether a sample rack is loaded on the shuttle; and when it is determined that a sample rack is loaded on the shuttle, firstly conveying the sample rack back to the loading/unloading area by the shuttle.

In some embodiments, the shuttle firstly completely transfers the sample rack on the shuttle to the loading/unloading area, after it is determined that the shuttle is in an interactive state with the loading/unloading area.

In some embodiments, the sample rack recovery method further includes: when it is determined that the shuttle is in an interactive state with the buffer area, completely transferring, by the shuttle, the sample rack on the shuttle to the buffer area, or completely transferring the sample rack on the shuttle onto the shuttle and conveying the sample rack back to the loading/unloading area.

In some embodiments, the sample rack recovery method further includes: after it is determined that the shuttle is in an interactive state with the sampling area, determining whether the shuttle interferes with return of a pushing device configured to control the sample rack to move in the sampling area.

In some embodiments, the sample rack recovery method further includes: after it is determined that the shuttle does not interfere with the returning of the pushing device, returning the pushing device and determining whether there is a sample rack on the shuttle. The shuttle firstly conveys the sample rack back to the loading/unloading area, after it is determined that there is a sample rack on the shuttle.

In some embodiments, the sample rack recovery method further includes: after it is determined that the shuttle interferes with the return of the pushing device, the shuttle is firstly moved so as to not interfere with the return of the pushing device, and then the pushing device is returned.

In some embodiments, the sample rack recovery method further includes: determining whether there is a sample rack on the shuttle; and after it is determined that there is a sample rack on the shuttle, the shuttle firstly conveys the sample rack on the shuttle back to the loading/unloading area.

In some embodiments, the sample rack detection step includes: detecting whether the loading/unloading area is fully loaded with sample racks. When it is detected that the loading/unloading area is fully loaded with sample racks, the sample rack recovery step is performed after an operator takes out one or more sample racks from the loading/unloading area.

In some embodiments, the sample rack recovery method further includes: controlling the shuttle to return to an initial position before the sample rack recovery step.

In some embodiments, the sample rack recovery method further includes: controlling the shuttle to return to an initial position after the sample rack recovery step.

In some embodiments, the sample rack recovery step includes: determining, based on measured distances between each of the sample rack and the shuttle, a recovery priority of the sample rack.

In some embodiments, the sample rack recovery step includes: firstly conveying the sample rack in the sampling area to the loading/unloading area, and then conveying the sample rack in the buffer area to the loading/unloading area.

In some embodiments, the sample rack detection step includes: detecting the position of the sample rack in the buffer area by a sensor provided on the shuttle when moving along with the shuttle.

In some embodiments, the shuttle detection step includes: detecting a loading state of the sample rack of the shuttle by sensors provided at two ends and a middle part of the shuttle.

In some embodiments, the shuttle detection step includes: detecting a state of a track of the sample rack in the sampling area to determine whether the shuttle is in an interactive state with the sampling area.

In some embodiments, the shuttle detection step further includes: detecting, by a sensor provided on the shuttle, interaction between a pushing device for controlling the sample rack to move in the sampling area and the shuttle.

According to another aspect of the present application, a sample rack manipulation device capable of performing the above sample rack recovery method is provided.

According to yet another aspect of the present application, an automatic testing system including the above sample rack manipulation device is provided.

According to still yet another aspect of the present application, a computer-readable medium having programs stored thereon is provided, and the programs, when being executed by a processor, implement the above sample rack recovery method.

The above and other objects, features and advantages of the present application will be fully understood in combination with the detailed description given hereinafter and the accompanying drawings, which are given by way of illustration only and are not therefore considered as limitation to the present application.

BRIEF DESCRIPTION OF THE DRAWINGS

The accompanying drawings described herein are only used for illustrating the selected embodiments rather than all possible embodiments, and are not intended to limit the scope of the present application.

Corresponding reference numerals indicate corresponding parts throughout several views of the drawings.

DETAILED DESCRIPTION OF THE EMBODIMENTS

Exemplary embodiments according to the present application will now be more fully described with reference to the accompanying drawings.

Exemplary embodiments are provided such that the present application will be thorough, and will fully convey the scope of the present application to those skilled in the art. Examples of many specific details such as specific components, devices and methods are described to provide a thorough understanding of embodiments of the present application. It is apparent to those skilled in the art that, the exemplary embodiments may be implemented in many different forms without specific details, and should not be construed as limitation to the scope of the present application. In some exemplary embodiments, the well-known methods, well-known device structures, and well-known techniques will not be described in detail.

Overview of an Automatic Testing System

Figure 1:
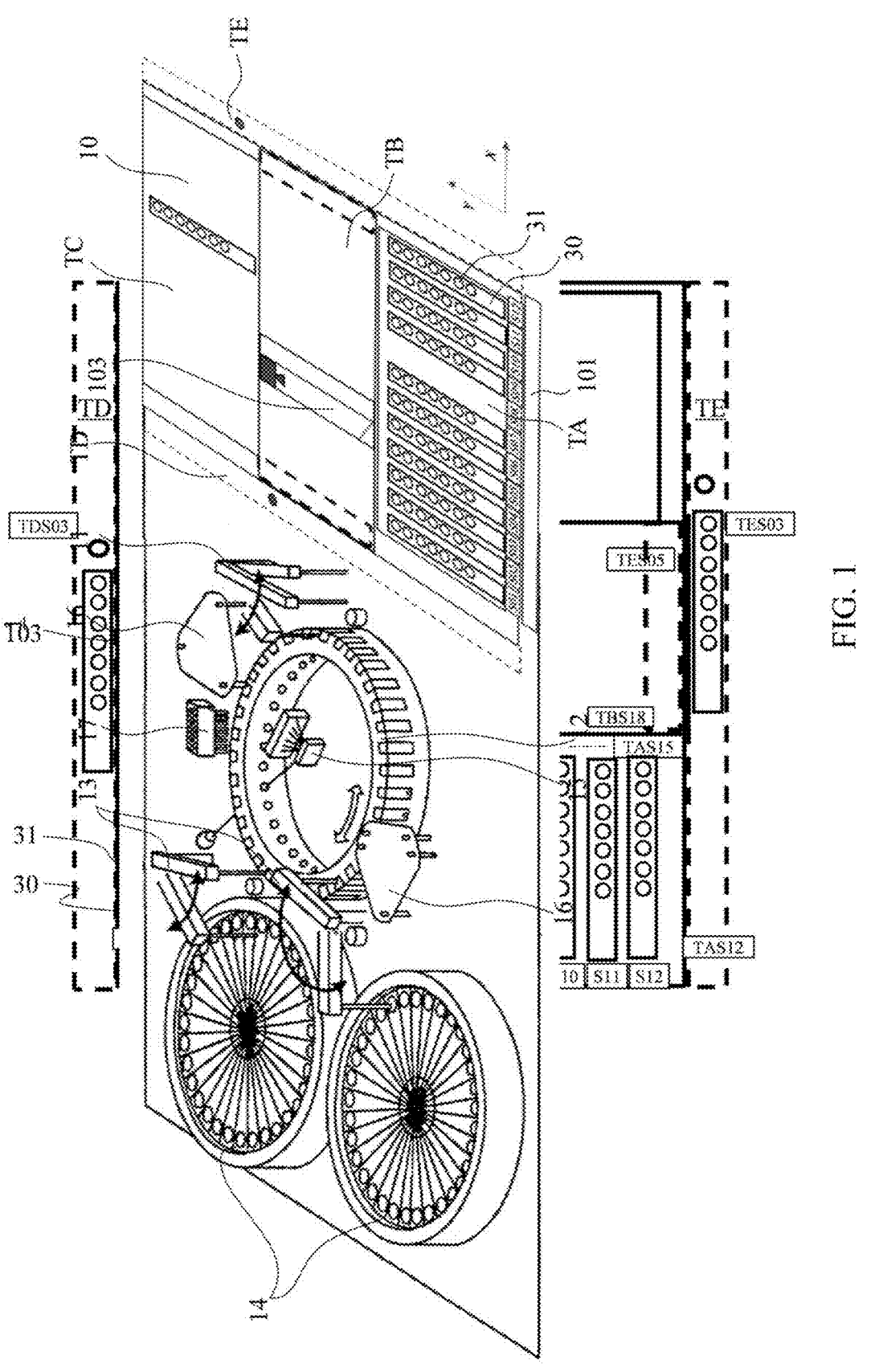
FIG. 1 is a schematic view showing a main structure of an automatic testing system including a sample rack manipulation device according to an embodiment of the present application.

The main structure and working principle of an automatic testing system 1 will be described hereinafter with reference to FIG. 1. FIG. 1 is a schematic view showing the main structure of the automatic testing system 1. For the sake of clarity, some components, in particular, a cover, a support structure, a control device, and the like, of the automatic testing system 1 are omitted in FIG. 1. The automatic testing system 1 is configured for automatically performing testing and analysis, for example, clinical chemistry, immunology or genetics, on multiple samples. As shown in FIG. 1, the automatic testing system 1 includes: a sample rack manipulation device 10, a sampler 11, a reaction table 12, a reagent dispenser 13, a reagent storage device 14, an optical analyzing device 15, a stirring device 16, and a cleaning device 17.

When a sample (for example, a biological liquid) needs to be tested for analysis, a test tube (container) 31 containing the sample is placed on a sample rack 30, as shown in FIG. 1, and then a door 101 of the sample rack manipulation device 10 is opened and the sample rack 30 is loaded into a loading/unloading area TA of the sample rack manipulation device 10. In the illustrated example, the sample rack 30 has an elongated shape and is used to accommodate multiple sample test tubes 31. Referring to FIG. 1 again, the sample rack 30 is conveyed from the loading/unloading area TA to a sampling area TD by a shuttle 103. The sample in the test tube 31 is collected into the reaction table 12 by the sampler 11. The reaction table 12 is rotated to convey the sample to the reagent dispenser 13, and the reagent dispenser 13 dispenses corresponding reagents stored in the reagent storage device 14 into the sample. The stirring device 16 stirs a mixture of sample and the reagent so as to uniformly mix them to facilitate the reaction. The reaction table 12 is rotated to a testing position, where the reaction product is tested and analyzed by the optical analyzing device 15 to obtain a testing and analysis result. After all the samples on the sample rack 30 are tested and analyzed, the reaction table 12 is cleaned by the cleaning device 17 for a next testing and analysis. After the sample is tested and analyzed, the sample rack manipulation device 10 conveys the tested sample rack 30 back to the loading/unloading area TA, and then the operator opens the door 101 and takes out the tested sample rack 30.

As can be known from the above description, the sample rack manipulation device 10 constitutes a sample rack manipulation unit of the automatic testing system 1, and components 11 to 17 shown in FIG. 1 constitute a sample testing unit of the automatic testing system 1. However, it should be understood that the automatic testing system 1 shown in FIG. 1 is for illustrative purposes only and is not intended to limit the present application. In addition, it should be understood that the sample rack manipulation device 10 may be connected to more than one sample testing unit. For example, the right side of the sample rack manipulation device 10 may also be connected to another sample testing unit (not shown in FIG. 1) for testing the same sample or a different sample.

Sample Rack Manipulation Device

As described above, the sample rack manipulation device 10 constitutes a sample rack manipulation unit of the automatic testing system 1. The sample rack manipulation device 10 includes a housing (not shown) in the form of a substantially rectangular parallelepiped and a door 101. The door 101 may be opened to allow the sample rack 30 to be placed in the loading/unloading area TA of the sample rack manipulation device 10 or to allow the sample rack 30 to be taken out from the loading/unloading area TA. In addition, the door 101 may be closed to form a closed space, providing a safe and reliable environment for the manipulation of the sample rack.

The sample rack manipulation device 10 further includes a shuttle 103 configured to convey the sample rack to multiple areas for performing corresponding operations (such as, loading, unloading, sampling or waiting). Referring to FIG. 1, based on the operating state of the sample rack 30, the sample rack manipulation device 10 includes a loading/unloading area TA, a transfer area TB, a buffer area TC, and sampling areas TD and TE (in a case of having two sample testing units). It should be understood that in a case that the automatic testing system 1 has only one sample testing unit, the sample rack manipulation device 10 may have only one sampling area TD or TE.

The sample rack 30 to be tested is firstly loaded in the loading/unloading area TA. Then, the sample rack 30 is conveyed to the buffer area TC via the transfer area TB by the shuttle 103, and then the sample rack 30 is conveyed from the buffer area TC, via the transfer area TB, to the sampling areas TD and TE, which interface with respective sample testing units, on two sides for sampling and testing. The tested sample rack is returned to the buffer area TC via the transfer area TB by the shuttle 103 again to wait for the testing result. If the tested sample rack does not need to be re-tested, the tested sample rack is finally returned to the loading/unloading area TA by the shuttle 103 for unloading (i.e., taking out). If the tested sample rack needs to be re-tested, the tested sample rack waits in the buffer area TC so as to be conveyed to the sampling area TD or TE again for sampling and testing. It should be understood that the sample rack manipulation device 10 according to the present application is not limited to the specific operation process described above. For example, the sample rack 30 may be directly conveyed from the loading/unloading area TA to the sampling area TD or TE via the transfer area TB. Similarly, the tested sample rack may also be directly returned from the sampling area TD or TE to the loading/unloading area TA via the transfer area TB.

Loading/Unloading Area TA

The loading/unloading area TA is arranged adjacent to the door 101 and extends along the length of the door 101 (i.e., the horizontal direction in FIG. 1). The loading/unloading area TA is substantially rectangular in shape. In the example of FIG. 1, the loading/unloading area TA is provided with multiple sample rack channels S01 to S12 extending substantially perpendicular to the door 101 for placing the elongated sample rack 30. However, it should be understood that the shape or structure of the sample rack may be changed, and accordingly, the shape or structure of the sample rack channel may also be changed, and it is not limited to the specific example shown in the drawings.

A bottom of the door 101 is pivotably connected to a housing (not shown), whereby the door 101 may be opened by being pivoted outward around the bottom, so that an operator can conveniently load or take out the sample rack 30 carrying the sample test tube 31 into or from the channel of the loading/unloading area TA.

Figure 2:
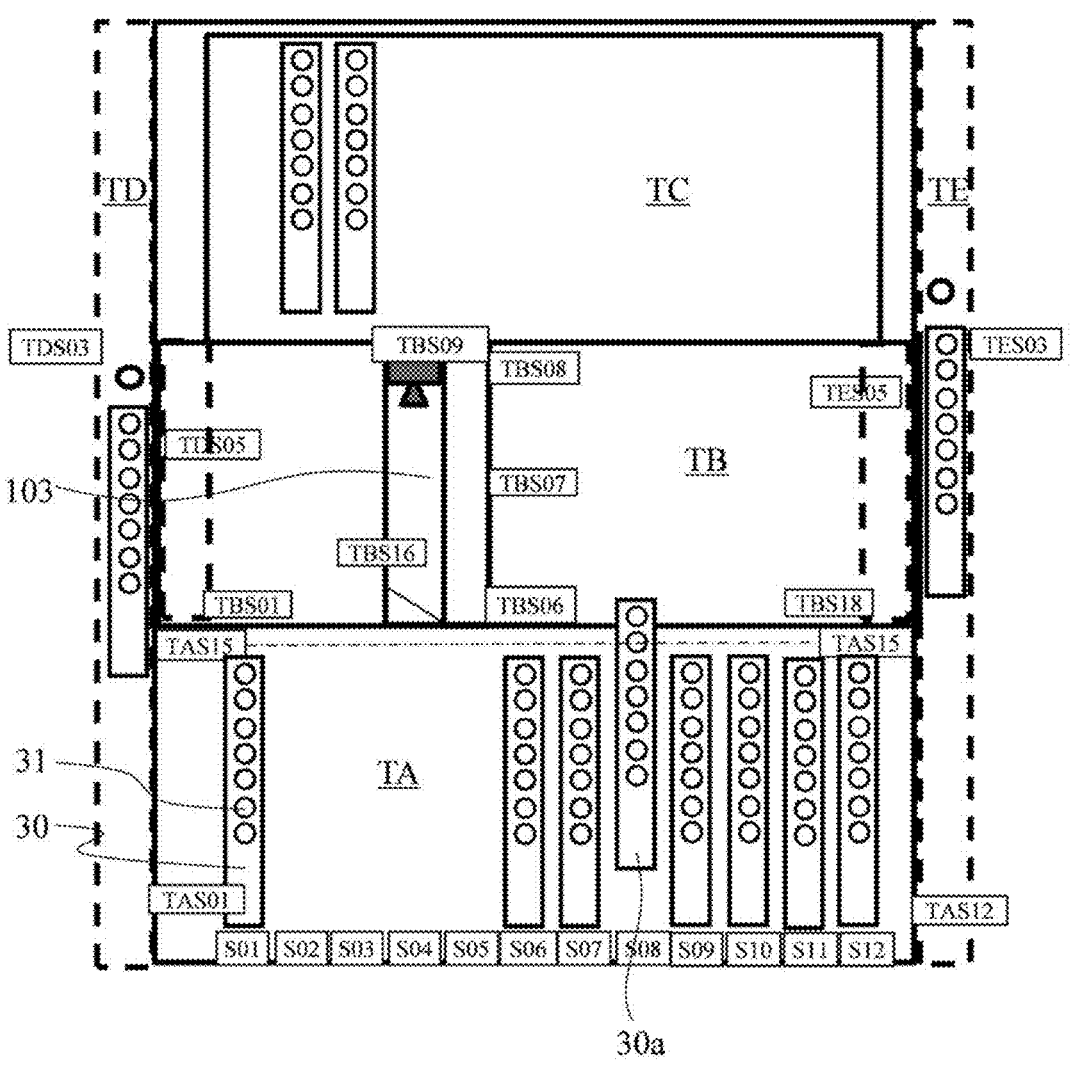
FIG. 2 is a schematic view of the sample rack manipulation device in FIG. 1, in which the arrangement of sensors in multiple areas is shown.

Referring to FIG. 2, each of channels S01 to S12 is provided with corresponding one of sensors TAS01 to TAS12 for detecting whether a sample rack 30 is loaded in the channel. An indicator light (not shown) may be provided for each of the channels to indicate the loading and testing of the sample rack in the channel, for example, the cases that no sample rack is loaded, the sample rack to be tested is loaded, and the tested sample rack is loaded.

A sensor TAS15 is provided at a position, adjacent to the transfer area TB, in the loading/unloading area TA. In the example of FIG. 2, the sensor TAS15 is arranged in a horizontal direction to detect whether a sample rack exceeds the sample rack channel and partially enters the transfer area TB during loading or transfer. For example, in FIG. 2, it is detected by the sensor TAS15 that the sample rack 30a exceeds the sample rack channel S08.

It should be understood that the sensor for detecting the sample rack in the loading/unloading area TA is not limited to the specific example shown in the drawings, and may be changed as needed.

Buffer Area TC

The buffer area TC and the loading/unloading area TA are arranged opposite to each other on two sides of the transfer area TB. In FIG. 2, the buffer area TC is located at an upper side of the transfer area TB, and the loading/unloading area TA is located at a lower side of the transfer area TB. The buffer area TC is used to temporarily store the sample rack, for example, for waiting the sample rack to be conveyed to the sampling area TD or TE for testing or waiting for the testing result.

The size and configuration of the buffer area TC may be substantially the same as that of the loading/unloading area TA. Like the loading/unloading area TA, the buffer area TC may be provided with multiple sample rack channels arranged side by side so as to store multiple sample racks. The sample rack channel in the buffer area TC may correspond to or be aligned with the sample rack channel in the loading/unloading area TA.

The buffer area TC, like the loading/unloading area TA, may be provided with multiple sensors to detect the loading of the sample rack in each sample rack channel. However, it should be understood that the arrangement of the sensors in the buffer area TC may be different from that of the sensors in the loading/unloading area TA. For example, referring to FIG. 2, in order to reduce the cost, a sensor TBS09 may be provided on one end, facing the buffer area TC, of the shuttle 103, as shown in FIG. 2. When moving in the horizontal direction along with the shuttle 103, the sensor TBS09 can detect whether there is a sample rack in each sample rack channel of the buffer area TC.

Sampling Areas TD and TE

The sampling areas TD and TE are respectively arranged on two sides (a left side and a right side in FIG. 2) in the lateral direction of the loading/unloading area TA and the buffer area TC arranged side by side. The sampling areas TD and TE are interface areas of the sample rack manipulation device 10 for interfacing with the corresponding testing units. When the sample rack 30 to be tested is transferred from the buffer area TC or the loading/unloading area TA to the sampling area TD or TE by the shuttle 103, the sample in the test tube 31 is collected into the reaction table 12 (see FIG. 1) by the sampler 11 (see FIG. 1) for testing, as described above.

After the sample in one test tube 31 is collected, the sample rack 30 is moved so that a next test tube 31 reaches a sampling position of the sampler 11 for the next sampling, until the samples in all the test tubes 31 on one sample rack

30 are sampled. After that, the tested sample rack 30 is transferred from the sampling area TD or TE to the buffer area TC by the shuttle 103 to wait for the testing result. If there is no need for further testing, the tested sample rack in the buffer area TC is transferred by the shuttle 103 to the loading/unloading area TA for unloading. If the tested sample rack is required to be re-tested (which may be the re-tested by the same testing unit or by a different testing unit), the sample rack that has been tested once will wait in the buffer area TC to be sent to the sampling area TD or TE for the next sampling and testing. In order to improve the testing efficiency, during the sampling of one sample rack, another sample rack may be conveyed to the sampling areas TD and TE to wait for sampling.

Referring to FIG. 2, a sensor TDS03 may be provided in the sampling area TD to detect whether a sample rack exists in the sampling area TD. Similarly, a sensor TES03 may be provided in the sampling area TE to detect whether a sample rack exists in the sampling area TE.

Transfer Area TB

The shuttle 103 moves in the transfer area TB to convey the sample rack to various areas of the sample rack manipulation device 10. For this reason, the loading/unloading area TA, the buffer area TC, and the sampling areas TD and TE of the sample rack manipulation device 10 are arranged adjacent to and around the transfer area TB. As shown in the drawings, the shuttle 103 may move in an X direction (horizontal direction in the drawings) and a Y direction (vertical direction in the drawings) in the transfer area TB, so as to be able to access the loading/unloading area TA, the buffer area TC and the sampling areas TD and TE. Therefore, it can be considered that the transfer area TB is an area in which the shuttle 103 moves.

Shuttle

The shuttle 103 may be provided with multiple motors to realize movement of the shuttle 103 in the X direction and the Y direction and lifting movement in the transfer area TB, and further realize the interaction between the shuttle 103 and the loading/unloading area TA, the buffer area TC, and the sampling areas TD and TE.

As the shuttle 103 is an important movable component for conveying the sample rack, it is necessary to accurately control the position of the shuttle 103 and accurately obtain the loading state of the sample rack in the shuttle 103.

For this reason, an initial position is usually set for the shuttle 103, for example, at a position adjoining the buffer area TC and the sampling area TD. Before the sample rack manipulation device 10 is started, the shuttle 103 is usually stopped at the initial position. When the sample rack manipulation device 10 is about to stop after completing the operation, the shuttle 103 returns to the initial position after conveying all the sample racks to the loading/unloading area TA for the next operation of the sample rack manipulation device 10. By setting of the initial position, the position of the shuttle 103 can be calculated advantageously and accurately, and an accumulated error in the position of the shuttle 103 can be eliminated. A sensor (not shown) is provided at the initial position to detect whether the shuttle 103 is in the initial position.

However, when the sample rack manipulation device 10 is interrupted, for example, due to an accidental power failure, the shuttle 103 is usually not stopped at the initial position, but rather at any possible position, for example, at any position on the way of conveying the sample rack or at a position where the shuttle 103 is in an interactive state with one of the loading/unloading area TA, the buffer area TC, and the sampling areas TD and TE.

The term "interactive state" is used herein to indicate the state where the sample rack has not been completely transferred between one of the loading/unloading area TA, the buffer area TC, and the sampling areas TD and TE and the shuttle 103, and the state where there is an element (for example, a push rod for pushing the sample rack to move in the sampling area) that interacts with the shuttle 103 and may hinder the relative movement of each other. In addition, the term "non-interactive state" is used to indicate the state where the shuttle 103 is movable freely in the transfer area TB to convey the sample rack loaded on the shuttle 103 to another area or to convey the sample rack away from another area.

In order to determine the state of the shuttle 103, sensors TBS06, TBS07 and TBS08 are provided on the shuttle 103 along a longitudinal direction of the shuttle 103. Referring to FIG. 2, the sensor TBS06 is located at one end facing the loading/unloading area TA. The sensor TBS08 is located at one end facing the buffer area TC, that is, opposite to the sensor TBS06. The sensor TBS07 is located between the sensor TBS06 and the sensor TBS08.

Referring to FIG. 2, none of the sensors TBS06, TBS07 and TBS08 detecting the sample rack 30 indicates that there is no sample rack 30 on the shuttle 103. In this case, the shuttle 103 is in a non-interactive state where a sample rack 30 will be conveyed away from one of the loading/unloading area TA, the buffer area TC, and the sampling areas TD and TE.

Figures 3, 4, 5:
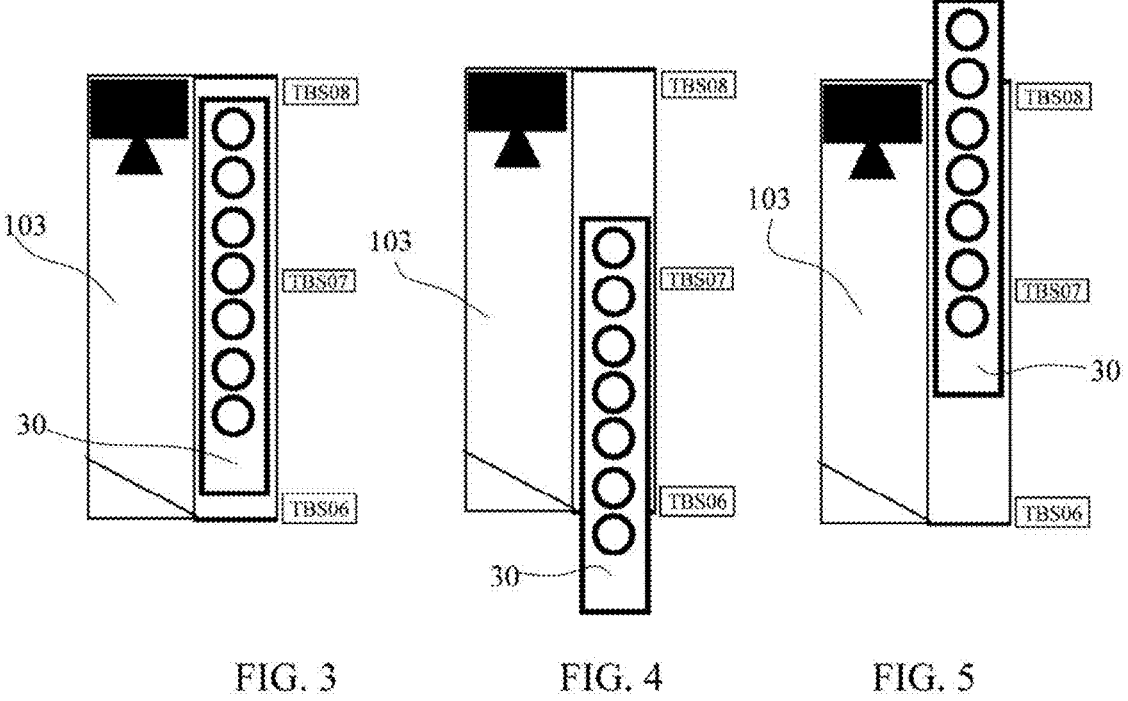
FIG. 3 is a schematic view showing a loading state of a sample rack of a shuttle.
FIG. 4 is a schematic view showing another loading state of the sample rack of the shuttle.
FIG. 5 is a schematic view showing yet another loading state of the sample rack of the shuttle.

Referring to FIG. 3, each of the sensors TBS06, TBS07 and TBS08 detecting the sample rack 30 indicates that the sample rack 30 is completely loaded on the shuttle 103. In this case, the shuttle 103 is in a non-interactive state where the sample rack 30 will be conveyed to one of the loading/unloading area TA, the buffer area TC, and the sampling areas TD and TE.

Referring to FIG. 4, both sensors TBS06 and TBS07 detecting the sample rack 30 and the sensor TBS08 not detecting the sample rack 30 indicates that a part of the sample rack 30 is located on the shuttle 103, while another part of the sample rack 30 is located in the loading/unloading area TA. In an example not shown, only the sensor TBS06 detecting the sample rack 30 also indicates that a part of the sample rack 30 is located on the shuttle 103, while another part of the sample rack 30 is located in the loading/unloading area TA. In this case, the shuttle 103 is in an interactive state with the loading/unloading area TA.

Referring to FIG. 5, both sensors TBS08 and TBS07 detecting the sample rack 30 and the sensor TBS06 not detecting the sample rack 30 indicates that a part of the sample rack 30 is located on the shuttle 103, while another part of the sample rack 30 is located in the buffer area TC. In an example not shown, only the sensor TBS08 detecting the sample rack 30 also indicates that a part of the sample rack 30 is located on the shuttle 103, and another part of the sample rack 30 is located in the buffer area TC. In this case, the shuttle 103 is in an interactive state with the buffer area TC.

Referring to FIG. 2 again, a sensor TBS16 may be further provided on the shuttle 103. The sensor TBS16 is adapted to cooperate with a detection feature (e.g., a detection tab or a detection notch) on a movement trajectory of the shuttle 103 to detect the position of the shuttle 103 in the X direction.

Furthermore, a sensor TBS01 may be provided in the transfer area TB for detecting whether the shuttle 103 is located at a position adjacent to the sampling area TD for unloading the sample rack from the sampling area TD or loading the sample rack into the sampling area TD. Similarly, a sensor TBS18 may be further provided in the transfer area TB for detecting whether the shuttle 103 is located at a position adjacent to the sampling area TE for unloading the sample rack from the sampling area TE or loading the sample rack into the sampling area TE.

In some embodiments, a sensor TDS05 may be further provided for detecting whether a sample rack channel of the sampling area TD is located at an initial position, thereby determining whether the shuttle 103 is in an interactive state with, for example, the above push rod (not shown). Similarly, a sensor TES05 may be further provided for detecting whether a sample rack channel of the sampling area TE is located at an initial position, thereby determining whether the shuttle 103 is in an interactive state with, for example, the push rod (not shown).

The push rod (not shown) is configured to push the sample rack in the sampling area TD so that the samples in test tubes on the sample rack are sampled one by one, and in a case that two sample racks can exist in the sampling area TD, the push rod (not shown) is configured to push the sample racks so that one of the sample racks is loaded or unloaded and the other of the sample racks is pushed to the sampling position. When the shuttle 103 interacts with the push rod, there may be a case that hinders the relative movement between the shuttle 103 and the push rod. Therefore, the interactive state between the shuttle 103 and the push rod may be determined by combining the detection results of the sensors TDS05, TES05 and TBS16 (see Table 1 below).

TABLE 1

| position of shuttle | TDS05 | TBS16 | TES05 |
|---|---|---|---|
| position A1 | initial position | — | initial position |
| position A2 | non-initial position | interfering | initial position |
| position A3 | non-initial position | non-interfering | initial position |
| position A4 | initial position | interfering | non-initial position |
| position A5 | initial position | non-interfering | non-initial position |

Figure 6:
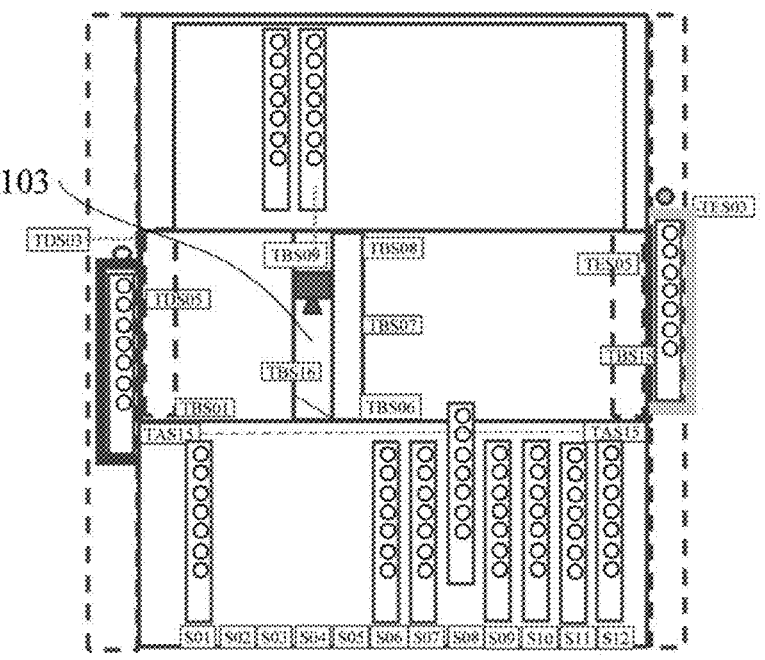
FIG. 6 is a schematic view showing a position of the shuttle.

The sensors TDS05 and TES05 respectively detecting that the sample rack channels in the sampling areas TD and TE are located at an initial position indicates that the shuttle 103 is located in the transfer area TB and does not interact with the sampling areas TD and TE, that is, the shuttle 103 is located at the position A1 shown in FIG. 6. In this case, there is no need to refer to the detection result of the sensor TBS16.

The sensor TDS05 detecting that the sample rack channel in the sampling area TD is located at a non-initial position and the sensor TES05 detecting that the sample rack channel in the sampling area TE is located at an initial position indicates that the shuttle 103 is in an interactive state with the sampling area TD. In this case, in order to further determine the position of the shuttle 103, it is required to refer to the detection result of the sensor TBS16.

Figure 7:
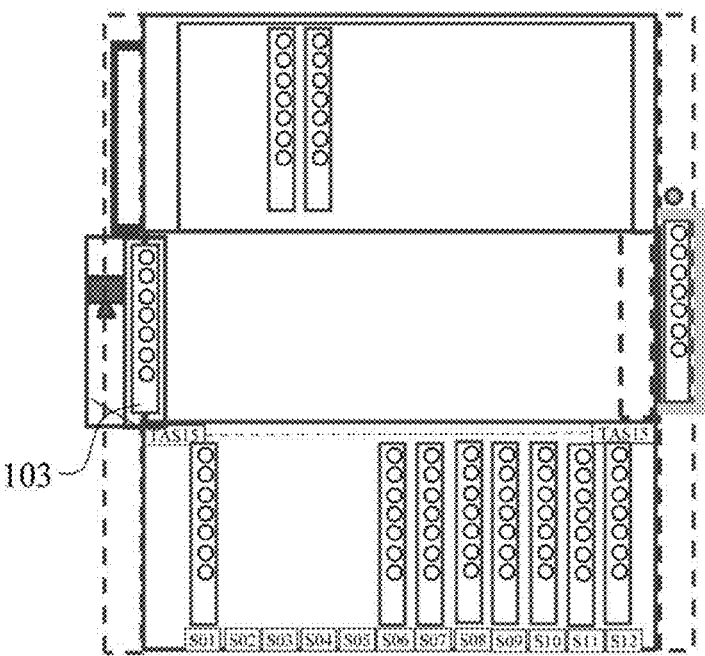
FIG. 7 is a schematic view showing another position of the shuttle.

The sensor TBS16 detecting that the shuttle 103 interferes with the return of the push rod further indicates that the shuttle 103 is located at the position A2 shown in FIG. 7, that is, in an interfering interactive state.

Figure 8:
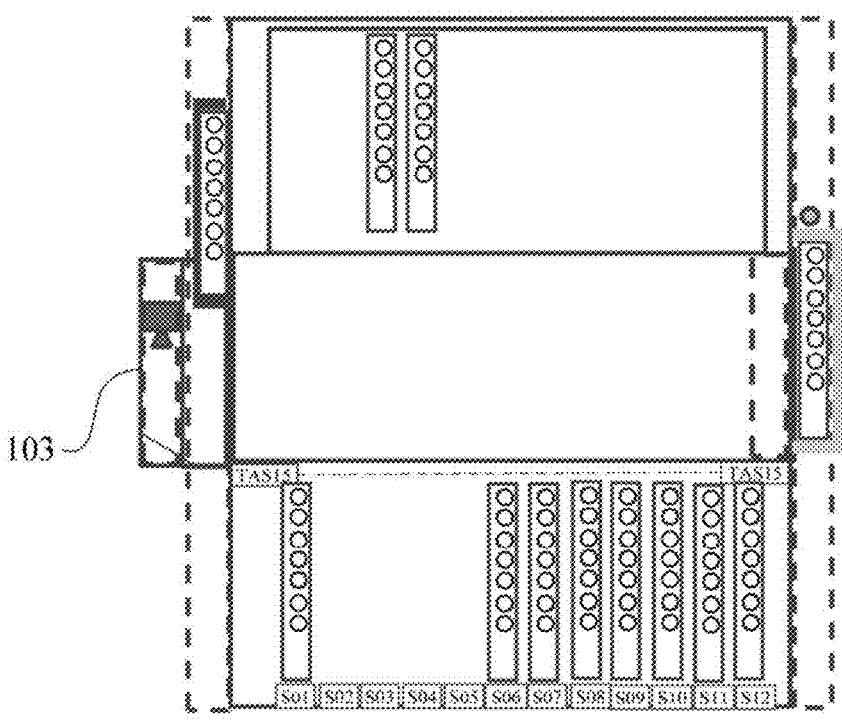
FIG. 8 is a schematic view showing yet another position of the shuttle.

The sensor TBS16 detecting that the shuttle 103 does not interfere with the return of the push rod further indicates that the shuttle 103 is located at the position A3 shown in FIG. 8, that is, in a non-interference interactive state.

The sensor TDS05 detecting that the sample rack channel in the sampling area TD is located at the initial position and the sensor TES05 detecting that the sample rack channel in the sampling area TE is located at the non-initial position indicates that the shuttle 103 is in an interactive state with the sampling area TE. In this case, in order to further determine the position of the shuttle 103, it is required to refer to the detection result of the sensor TBS16.

Figure 9:
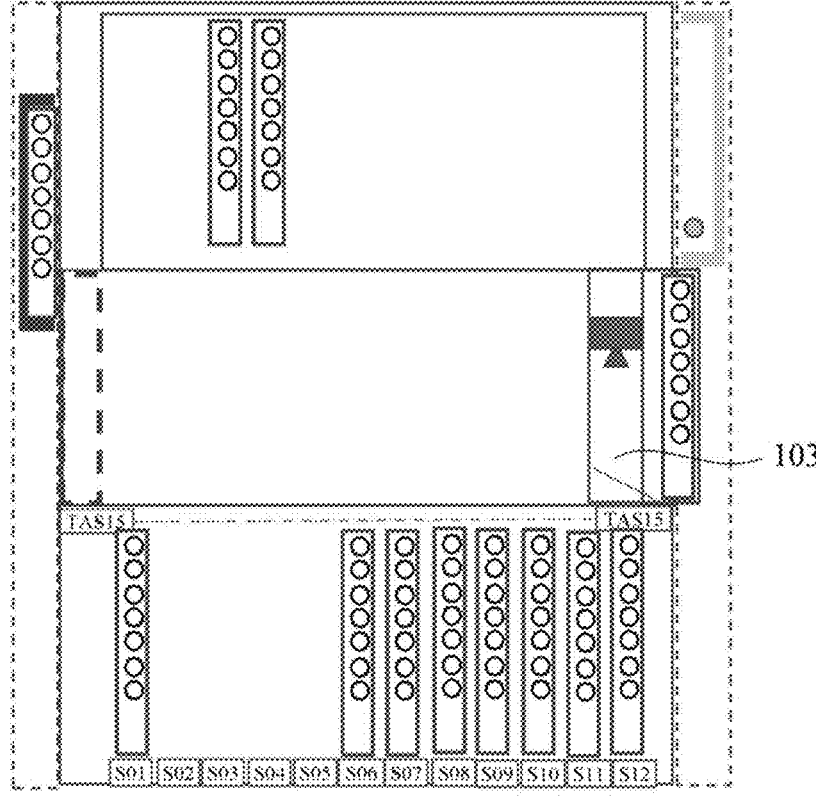
FIG. 9 is a schematic view showing still yet another position of the shuttle.

The sensor TBS16 detecting that the shuttle 103 interferes with the return of the push rod further indicates that the shuttle 103 is located at the position A4 shown in FIG. 9.

Figure 10:
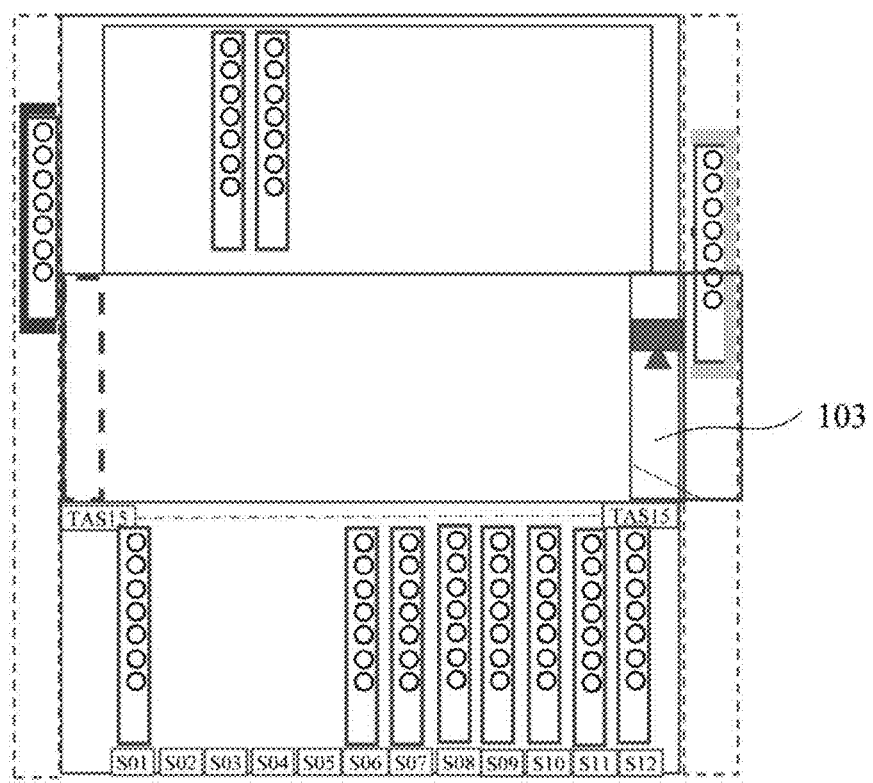
FIG. 10 is a schematic view showing still yet another position of the shuttle.

The sensor TBS16 detecting that the shuttle 103 does not interfere with the return of the push rod further indicates that the shuttle 103 is located at the position A5 shown in FIG. 10.

It should be understood that, the above push rod is only one example of a pushing device used for pushing the sample rack to move in the sampling area. When the structure, arrangement or pushing manner of the pushing device changes, the interactive mode between the shuttle 103 and the sampling area may also change.

It should also be understood that the types and arrangements of various components and areas and sensors of the sample rack manipulation device according to the present application are not limited to the specific examples shown in the drawings, as long as they can realize the above functions.

For example, in the given embodiment, the loading area and unloading area of the sample rack are not provided separately, but the functions thereof are realized through a common loading/unloading area. However, the present application is not limited to this, and a separate unloading area may be additionally arranged in a downstream area, opposite to an upstream loading area, of a conveyor belt.

In the given embodiment, the loading/unloading area and the buffer area of the sample rack manipulation device are arranged substantially symmetrically. However, the buffer area may have a different sample rack capacity from the loading/unloading area according to an actual situation.

Sample Rack Recovery Method

When the sample rack manipulation device 10 is accidentally powered off and interrupted, a sample rack may exist in one or more of the loading/unloading area TA, the buffer area TC, and the sampling areas TD and TE, and components such as the shuttle 103 and the push rod may not return to the initial positions. Therefore, in a case that the sample rack manipulation device 10 is restarted, it is required to automatically recover the sample rack to the loading/unloading area TA for the operator to take the sample rack out from the load/unloading area TA, and to return the shuttle 103 to the initial position so that the sample rack manipulation device 10 restores to a normal detection procedure.

The automatic recovery method of a sample rack according to the present application will be described below based on possible situations of the sample rack manipulation device 10 after accidental power failure.

Example 1: The Shuttle is in a Non-Interactive State and No Sample Rack is Loaded As described above, when no sample rack is detected by each of the sensors TBS06, TBS07 and TBS08, it can be determined that no sample rack is loaded on the shuttle 103, which indicates that the shuttle 103 does not interact with the loading/unloading area TA or the buffer area TC. In addition, the sensors TDS05 and TES05 respectively detecting that the sample rack channels in the sampling areas TD and TE are in the initial positions may further indicate that the shuttle 103 is in the non-interactive state.

Figure 12:
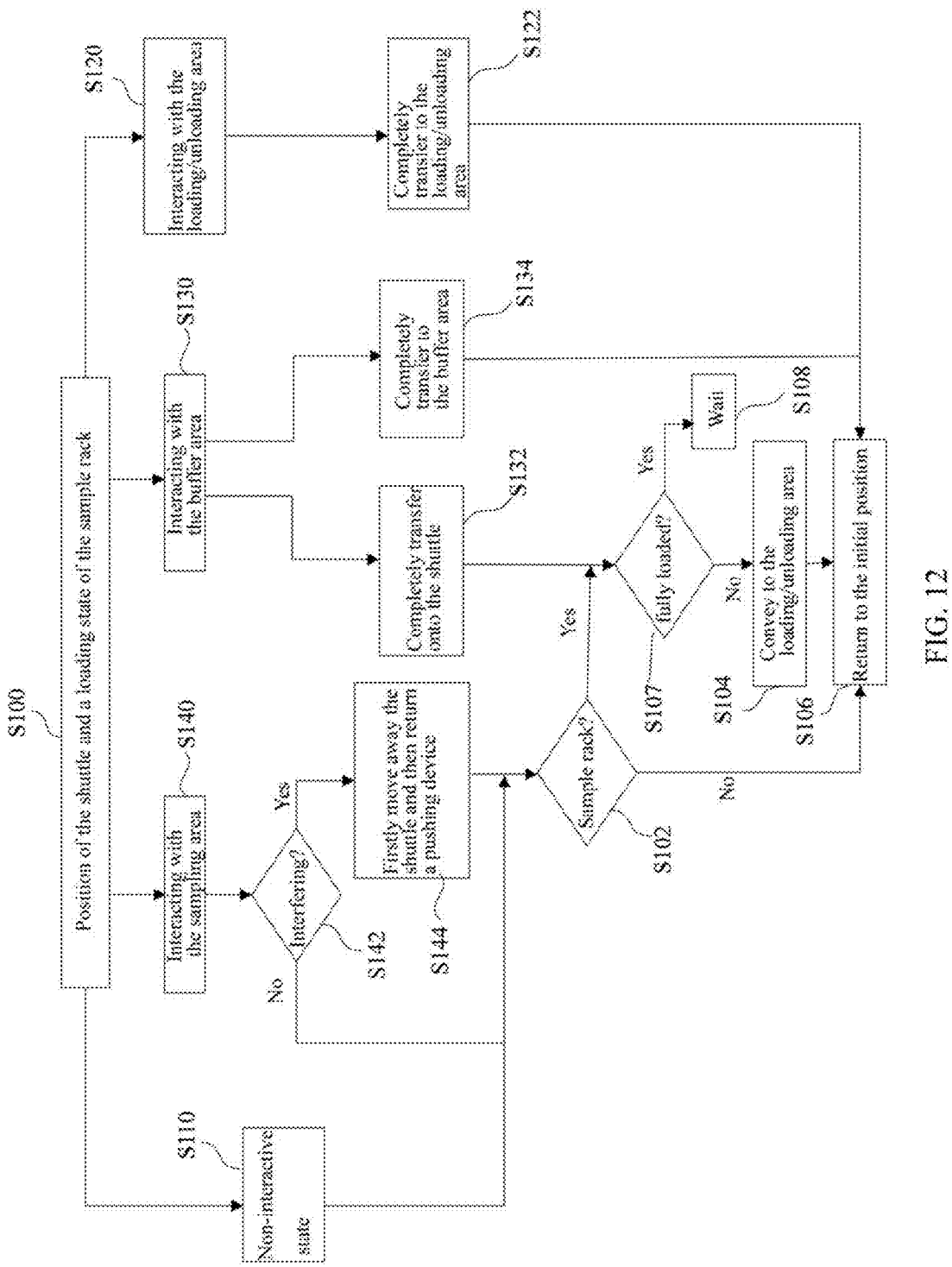
FIG. 12 is a flowchart of detecting a state of a shuttle according to an embodiment of the present application.

Therefore, in this example, it is detected by the sensor that the shuttle is in a non-interactive state that the shuttle is movable freely in the transfer area and no sample rack is loaded (see step S110 in FIG. 12).

In this case, the shuttle 103 may be firstly returned to the initial position. The position of the sample rack in the areas of the sample rack manipulation device is detected. Then, based on the situations of the sample racks in the loading/unloading area TA, the buffer area TC, and the sampling areas TD and TE detected by the sensors, the sample racks in the buffer area TC, and the sampling areas TD and TE are conveyed by the shuttle 103 back to the unloaded sample rack channels in the loading/unloading area TA one by one. If the loading/unloading area TA has fully loaded with sample racks, the sample rack in other areas may be conveyed back to the unloaded sample rack channel in the loading/unloading area TA after the operator takes out one or more sample racks from the loading/unloading area TA.

In order to improve the recovery efficiency of the sample racks, the shuttle 103 may be configured to firstly recover a sample rack closest to the shuttle 103, and then recover a sample rack farther from the shuttle 103. That is, a recovering order of the sample racks may be determined based on distances from the shuttle 103. In this way, the recovery efficiency is improved by reducing a movement distance of the shuttle 103.

In order to realize efficient detection of the sensor, the shuttle 103 may firstly recover the sample rack in the sampling area and then recover the sample rack in the buffer area TC. In this way, when the shuttle 103 recovers the sample racks in the sampling areas TD and TE, the sensor TBS09 may detect whether there is a sample rack in each of the sample rack channels in the buffer area TC as the shuttle 103 moves in the horizontal direction (X direction).

Example 2: the Shuttle is in a Non-Interactive State and Loaded With a Sample Rack Example 2 is different from Example 1 in that the sensors TBS06, TBS07 and TBS08 each detect a sample rack, it can be determined that the shuttle 103 is loaded with the sample rack and is in a non-interactive state.

In Example 2, the shuttle 103 may firstly return to the initial position together with the sample rack, and then convey the sample rack back to the unloaded sample rack channel in the loading/unloading area TA. Afterwards, the shuttle 103 recovers the sample racks in the sampling area and the buffer area into the loading/unloading area TA one by one as shown in Example 1.

In an alternative embodiment, alternatively, the shuttle 103 may firstly convey the sample rack on the shuttle 103 back to the loading/unloading area TA, and then return to the initial position. Afterwards, the shuttle 103 recovers the sample racks in the sampling area and the buffer area into the loading/unloading area TA one by one.

If the loading/unloading area TA has fully loaded with sample racks, the sample rack in other areas may be conveyed back to the unloaded sample rack channel in the loading/unloading area TA after the operator takes out one or more sample racks from the loading/unloading area TA.

Example 3: The Shuttle is in an Interactive State with the Loading/Unloading Area or the Buffer Area As mentioned above, one or both of the sensors TBS06 and TBS07 detecting the sample rack 30 and the sensor TBS08 not detecting the sample rack indicates that the shuttle 103 is in an interactive state with the loading/unloading area TA.

In a case that it is determined that the shuttle 103 is in an interactive state with the loading/unloading area TA, the sample rack is firstly completely transferred to the sample rack channel in the loading/unloading area TA, and then the shuttle 103 is controlled to return to the initial position. Afterwards, the shuttle 103 recovers the sample racks in the sampling area and the buffer area to the loading/unloading area TA one by one.

The interactive state between the shuttle 103 and the buffer area TC is similar to the interactive state between the shuttle 103 and the loading/unloading area TA, and will not be described repeatedly herein.

Example 4: The Shuttle is in an Interactive State with the Sampling Area

As mentioned above, the sensor TDS05 or TES05 detecting that the sample rack channel in the sampling area TD or TE is located at a non-initial position indicates that the shuttle 103 is in an interactive state with the sampling area TD or TE.

Further, in combination with the detection result of the sensor TBS16, it can be determined whether the shuttle 103 is in an interfering interactive state (as shown in FIGS. 7 and 9) or a non-interfering interactive state (as shown in FIGS. 8 and 10).

In a case that it is determined that the shuttle 103 is in an interfering interactive state, the shuttle 103 is firstly moved away from the sampling area (for example, the shuttle 103 in FIG. 7 is moved to the right and the shuttle 103 in FIG. 9 is moved to the left), so that the shuttle 103 no longer interferes with the return of the push rod. Then, the push rod is returned. In this case, whether there is a sample rack on the shuttle 103 is determined by the sensors TBS06, TBS07 and TBS08. In a case that it is determined that there is no sample rack on the shuttle 103, the sample rack manipulation device 10 may be operated according to the sample rack recovery method described in Example 1. In a case that it is determined that there is a sample rack on the shuttle 103, the sample rack manipulation device 10 may be operated according to the sample rack recovery method described in Example 2.

In addition, in a case that the sensor TDS03 detects that a sample rack exists in the sampling area, the push rod then moves to the position where the push rod interacts with the shuttle, so as to unload the sample rack detected in the sampling area onto the shuttle. Then, the shuttle conveys the sample rack back to the loading/unloading area TA. The process of the push rod returning to the interactive position and interacting with the shuttle to take out the sample rack from the sampling area is the same as the process of the sample rack manipulation device in normal operation, and is not repeated here.

In a case that it is determined that the shuttle 103 is in a non-interfering interactive state as shown in FIG. 8 and FIG. 10, the push rod may be returned. Based on the detection results of the sensors TBS06, TBS07 and TBS08, it is determined whether there is a sample rack on the shuttle 103. In a case that it is determined that there is no sample rack on the shuttle 103, the sample rack manipulation device 10 may be operated according to the sample rack recovery method described in Example 1. In a case that it is determined that there is a sample rack on the shuttle 103, the sample rack manipulation device 10 may be operated according to the sample rack recovery method described in Example 2.

Figure 11:
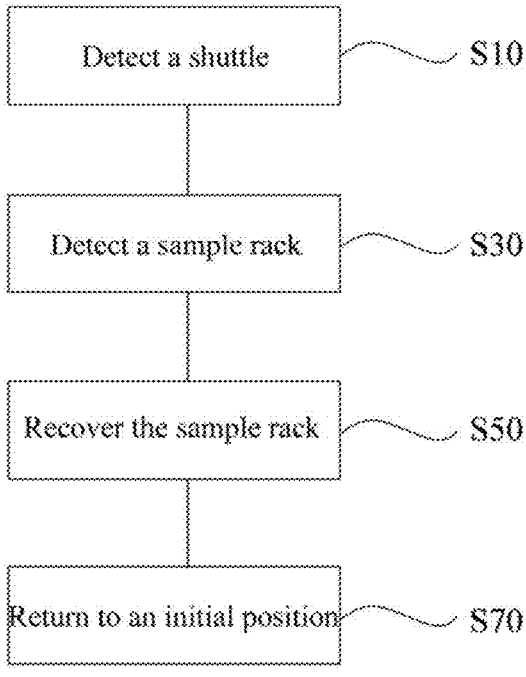
FIG. 11 is a flowchart of a sample rack recovery method according to an embodiment of the present application.

Through the descriptions of Examples 1 to 4 above, the sample rack recovery method according to the present application can be summarized as a flowchart as shown in FIG. 11. Referring to FIG. 11, the sample rack recovery method includes: a shuttle detection step S10 of detecting a state of the shuttle; a sample rack detection step S30 of detecting a position of a sample rack in the sample rack manipulation device, particularly in a loading/unloading area TA, a buffer area TC, and sampling areas TD and TE; and a sample rack recovery step S50 of conveying the sample rack to the loading/unloading area TA by the shuttle 103 based on the state of the shuttle 103 and the position of the sample rack. After the sample rack recovery step S50, the shuttle 103 may further be returned to an initial position (step S70) so as to perform a normal sample detection procedure.

FIG. 12 shows one embodiment of detecting the state of the shuttle. Referring to FIG. 12, the step S10 in FIG. 11 includes detecting a position of the shuttle 103 and a loading state of the sample rack (step S100).

Based on the position of the shuttle 103 and the loading state of the sample rack, it is determined whether the shuttle 103 is in a non-interactive state in which the shuttle 103 is movable freely (step S110) or in an interactive state with the loading/unloading area TA, the sampling area TD or TE, or the buffer area TC (steps S120, S130 and S140).

In a case that it is determined that the shuttle 103 is in a non-interactive state (step S110), it is determined whether a sample rack is loaded on the shuttle 103 (step S102). In a case that it is determined that there is a sample rack on the shuttle 103, the shuttle 103 firstly conveys the sample rack back to the loading/unloading area TA (step S104). Before the step S104, it is possible to detect whether the loading/unloading area TA has fully loaded with sample racks (step S107). In a case that the loading/unloading area TA is fully loaded with sample racks, the sample rack in other areas may be conveyed back to the unloaded sample rack channel in the loading/unloading area TA after an operator takes out one or more sample racks from the loading/unloading area TA (step S108). In a case that the loading/unloading area TA is not fully loaded with sample racks, the sample rack in other areas may be directly conveyed back to the unloaded sample rack channel in the loading/unloading area TA (step S104). Then, before the sample rack recovery step, the shuttle 103 may be controlled to return to the initial position (step S106).

In a case that it is determined that the shuttle 103 is in an interactive state with the loading/unloading area TA (step S120), the shuttle 103 firstly completely conveys the sample rack on the shuttle 103 into the loading/unloading area TA (step S122). Then, before the sample rack recovery step, the shuttle 103 may be controlled to return to the initial position (step S106).

In a case that it is determined that the shuttle 103 is in an interactive state with the buffer area TC (step S130), the shuttle 103 completely transfers the sample rack on the shuttle 103 to the buffer area TC (step S134), or completely transfers the sample rack on the shuttle 103 to the shuttle 103 (step S132) and conveys the sample rack back to the loading/unloading area TA (step S104). Before the step S104, it may be detected whether the loading/unloading area TA has fully loaded with sample racks (step S107). In a case that the loading/unloading area TA is fully loaded with sample racks, the sample rack in other areas may be conveyed back to the unloaded sample rack channel in the loading/unloading area TA after an operator takes out one or more sample racks from the loading/unloading area TA (step S108). In a case that the loading/unloading area TA is not fully loaded with sample racks, the sample rack in other areas may be directly conveyed back to the unloaded sample rack channel in the loading/unloading area TA (step S104). Then, before the sample rack recovery step, the shuttle 103 may be controlled to return to the initial position (step S106).

In a case that it is determined that the shuttle 103 is in an interactive state with the sampling area TD or TE (step S140), it is determined whether the shuttle 103 interferes with return of a pushing device for controlling movement of the sample rack in the sampling area (step S142).

In a case that it is determined that the shuttle 103 does not interfere with return of the pushing device, the pushing device is returned, and it is determined whether there is a sample rack on the shuttle 103 (step S102). In a case that it is determined that there is a sample rack on the shuttle, the shuttle firstly conveys the sample rack back to the loading/unloading area TA (step S104). Then, before the sample rack recovery step, the shuttle 103 may be controlled to return to the initial position (step S106).

In a case that it is determined that the shuttle 103 interferes with the return of the pushing device, the shuttle 103 is firstly moved so as not to interfere with the return of the pushing device, and then the pushing device is returned (step S144). Then, it is determined whether there is a sample rack on the shuttle (step S102). In a case that it is determined that there is a sample rack on the shuttle, the shuttle firstly conveys the sample rack on the shuttle back to the loading/unloading area TA (step S104). Before the step S104, it may be firstly detected whether the loading/unloading area TA has fully loaded with sample racks (step S107). In a case that the loading/unloading area TA is fully loaded with sample racks, the sample rack in other areas may be conveyed back to the unloaded sample rack channel in the loading/unloading area TA after an operator takes out one or more sample racks from the loading/unloading area TA (step S108). In a case that the loading/unloading area TA is not fully loaded with sample racks, the sample rack in other areas may be directly conveyed back to the unloaded sample rack channel in the loading/unloading area TA (step S104). Then, before the sample rack recovery step, the shuttle 103 may be controlled to return to the initial position (step S106).

It should be understood that, the above automatic recovery method of a sample rack is not limited to the above specific examples, but can be changed as needed. For example, the execution order of various steps of the automatic recovery method may be changed without contradiction, or may be combined with each other or a certain step may be omitted.

The devices and methods described herein may be implemented through one or more computer programs executed by one or more processors. The computer programs include processor-executable instructions stored on a non-transitory tangible computer readable medium. The computer programs may further include stored data. Non-limiting examples of non-transitory tangible computer-readable media are non-volatile memory, magnetic storage devices, and optical storage devices.

Although various embodiments and variations of the present application have been described in detail above, it should be understood by those skilled in the art that the present application is not limited to the specific embodiments and variations described above, but may include other various possible conjunctions and combinations. Other variations and modifications can be implemented by those skilled in the art without departing from the essence and scope of the present application. All the variations and modifications shall fall within the scope of the present application. Moreover, all the members described herein can be replaced by other technically equivalent members.

The invention claimed is:

1. A method of recovering a sample rack after an interruption in an operation of a sample rack manipulation device comprising a shuttle configured to convey one or more sample racks to and from a loading and unloading area, a sampling area and a buffer area by moving within a transfer area, the one or more sample racks configured to hold one or more sample containers, the method comprising:
   detecting a state of the shuttle;
   detecting a position of the sample rack within the sample rack manipulation device; and
   recovering the sample rack by conveying the sample rack to the loading and unloading area using the shuttle based on the detected state of the shuttle and the detected position of the sample rack.

2. The method according to claim 1, wherein the detecting the state of the shuttle comprises:
   detecting a position of the shuttle and a loading state of the sample rack.

3. The method according to claim 2, further comprising:
   determining, based on the position of the shuttle and the loading state of the sample rack, whether the shuttle is either in a freely movable non-interactive state or is in an interactive state with either the loading and unloading area, the sampling area or the buffer area.

4. The method according to claim 3, further comprising:
   with the shuttle is in the freely movable non-interactive state, determining whether there is any sample rack loaded on the shuttle; and
   with a sample rack loaded on the shuttle, firstly-conveying the sample rack back to the loading and unloading area using the shuttle.

5. The method according to claim 3, further comprising:
   with the shuttle is in the interactive state with the loading and unloading area, transferring the sample rack on the shuttle to the loading and unloading area.

6. The method according to claim 3, further comprising:
   with the shuttle is in the interactive state with the buffer area, either transferring the sample rack on the shuttle to the buffer area or conveying the sample rack back to the loading and unloading area.

7. The method according to claim 3, further comprising:
   with the shuttle is in the interactive state with the sampling area, determining whether the shuttle interferes with a return of a pushing device configured to move the one or more sample racks within the sampling area by controlling the one or more sample racks.

8. The method according to claim 7, further comprising:
   with the shuttle not interfering with the return of the pushing device, returning the pushing device and determining whether there is any sample rack on the shuttle, and with a sample rack on the shuttle, conveying the sample rack back to the loading and unloading area with the shuttle.

9. The method according to claim 7, further comprising:
   with the shuttle initially interfering with the return of the pushing device, moving the shuttle such that the shuttle does not interfere with the return of the pushing device, and with the shuttle not interfering with the return of pushing device, returning the pushing device.

10. The method according to claim 9, further comprising:
determining whether there is any sample rack on the shuttle; and
with a sample rack on the shuttle, conveying the sample rack on the shuttle back to the loading and unloading area using the shuttle.

11. The method according to claim 4, wherein the detecting the position of the one or more sample racks within the sample rack manipulation device comprises:
detecting whether the loading and unloading area is fully loaded with sample racks; and with the loading and unloading area fully loaded with the sample racks, further comprises manually removing one or more sample racks from the loading and unloading area before the recovering the sample rack.

12. The method according to claim 4, further comprising:
returning the shuttle to an initial position before the recovering of the sample rack by controlling the shuttle.

13. The method according to claim 1, further comprising:
returning the shuttle to an initial position after the recovering the sample rack by controlling the shuttle.

14. The method according to claim 1, wherein the recovering the sample rack further comprises:
determining, based on a distance measured between the sample rack and the shuttle, a recovery priority for the sample rack.

15. The method according to claim 1, wherein the recovering the sample rack further comprises:

conveying the sample rack within the sampling area to the loading and unloading area, and conveying the sample rack in the buffer area to the loading and unloading area.

16. The method according to claim 1, wherein the detecting the position of the one or more sample racks further comprises:
detecting the position of a sample rack in the buffer area using a sensor disposed on the shuttle.

17. The method according to claim 1, wherein the detecting the state of the shuttle further comprises:
detecting a loading state of the sample rack on the shuttle using a plurality of sensors, at least a first sensor at a first end of the shuttle, at least a second sensor at a second end of the shuttle and at least a third sensor at a middle part of the sensor.

18. The method according to claim 1, wherein the detecting the state of the shuttle further comprises:
determining whether the detecting shuttle is in an interactive state with the sampling area by detecting a state of a track of a sample rack in the sampling area.

19. The method according to claim 18, wherein the detecting the state of the shuttle further comprises:
detecting, using a sensor disposed on the shuttle, an interaction between a pushing device for controlling the sample rack to move into the sampling area and the shuttle.

* * * * *